(12) United States Patent
Petruzzelli (10) Patent No.: US 11,743,528 B2
(45) Date of Patent: *Aug. 29, 2023

(54) METHODS AND SYSTEMS FOR ADAPTIVE CONTENT DELIVERY

(71) Applicant: DISH Technologies L.L.C., Englewood, CO (US)

(72) Inventor: Edmund Petruzzelli, Centennial, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/444,962

(22) Filed: Aug. 12, 2021

(65) Prior Publication Data

US 2021/0377589 A1 Dec. 2, 2021

Related U.S. Application Data

(63) Continuation of application No. 15/786,110, filed on Oct. 17, 2017, now Pat. No. 11,122,320.

(51) Int. Cl.
| | |
|---|---|
| *H04L 41/50* | (2022.01) |
| *H04N 21/43* | (2011.01) |
| *H04L 41/00* | (2022.01) |
| *H04L 67/02* | (2022.01) |
| *H04H 20/63* | (2008.01) |

(Continued)

(52) U.S. Cl.
CPC .......... *H04N 21/43* (2013.01); *H04H 20/63* (2013.01); *H04L 41/32* (2013.01); *H04L 41/50* (2013.01);

(Continued)

(58) Field of Classification Search
CPC .............. H04N 21/43; H04N 21/4344; H04N 21/4347; H04N 21/4622; H04N 21/6112;

(Continued)

(56) References Cited

U.S. PATENT DOCUMENTS

| 5,959,592 A | 9/1999 | Petruzzelli |
| 6,987,767 B2 | 1/2006 | Saito |

(Continued)

FOREIGN PATENT DOCUMENTS

EP      2852078 A1     3/2015

*Primary Examiner* — Hassan Kizou
*Assistant Examiner* — Hector Reyes
(74) *Attorney, Agent, or Firm* — KW Law, LLP (57) ABSTRACT

Devices, systems and methods are provided for delivering media content from different types of content sources to different destination devices across an outdoor/indoor interface using an outdoor hub device. An exemplary hub device includes a first input interface to receive a broadcast signal, a second input interface to receive a telecommunications signal from a telecommunications network, and an output interface. The device further includes a content stream management module coupled to the first input interface and the second input interface to multiplex broadcast and telecommunications content into a multiplexed content stream, an encapsulation module coupled to the content stream management module to encapsulate the multiplexed content stream into a packetized multiplexed content stream, and a communications interface coupled to the encapsulation module and the output interface to transmit the packetized multiplexed content stream to an indoor gateway device via the output interface.

19 Claims, 3 Drawing Sheets

(51) Int. Cl.
   *H04N 21/434* (2011.01)
   *H04L 69/321* (2022.01)
   *H04N 21/462* (2011.01)
   *H04N 21/61* (2011.01)

(52) U.S. Cl.
   CPC .......... *H04L 67/02* (2013.01); *H04L 69/321* (2013.01); *H04N 21/4344* (2013.01); *H04N 21/4347* (2013.01); *H04N 21/4622* (2013.01); *H04N 21/6112* (2013.01); *H04N 21/6131* (2013.01); *H04N 21/6143* (2013.01)

(58) Field of Classification Search
   CPC ........... H04N 21/6131; H04N 21/6143; H04L 41/32; H04L 41/50; H04L 67/02; H04L 69/321
   See application file for complete search history.

(56) References Cited

U.S. PATENT DOCUMENTS

| | | |
|---|---|---|
| 2003/0028890 A1 | 2/2003 | Swart et al. |
| 2004/0017831 A1* | 1/2004 | Shen .................. H04N 21/2362 370/537 |
| 2004/0123097 A1* | 6/2004 | Ranjan ............ G11B 20/00086 713/153 |
| 2004/0250273 A1 | 12/2004 | Swix et al. |
| 2006/0117371 A1 | 6/2006 | Margulis |
| 2008/0120667 A1* | 5/2008 | Zaltsman ......... H04N 21/43615 348/E5.003 |
| 2009/0027401 A1* | 1/2009 | Loveridge .............. G09G 5/006 345/501 |
| 2010/0272010 A1* | 10/2010 | Hicks, III ............... H04L 65/80 370/328 |
| 2011/0093732 A1* | 4/2011 | Rembert ................. H04L 43/08 713/340 |
| 2011/0321114 A1 | 12/2011 | Newell |
| 2013/0205349 A1 | 8/2013 | Chang et al. |
| 2013/0242862 A1* | 9/2013 | Birlik ...................... H04L 47/50 370/328 |
| 2013/0332967 A1* | 12/2013 | Chang ................ H04N 21/4382 725/68 |
| 2016/0134374 A1 | 5/2016 | Hu et al. |
| 2017/0105053 A1 | 4/2017 | Todd |
| 2017/0118531 A1 | 4/2017 | Medina et al. |

* cited by examiner

METHODS AND SYSTEMS FOR ADAPTIVE CONTENT DELIVERY

CROSS-REFERENCE TO RELATED APPLICATION(S)

This application is a continuation of U.S. patent application Ser. No. 15/786,110, filed Oct. 17, 2017, which is incorporated by reference herein in its entirety.

TECHNICAL FIELD

Embodiments of the subject matter described herein relate generally to telecommunications systems supporting content delivery over various networks, and more particularly, systems, devices, and related operating methods for combining media content streams from different content sources at a location outside of a building or structure.

BACKGROUND

Telecommunications networks, such as the Internet, are expected to become predominant means for distributing multimedia content (e.g., video and audio or audio) to end users. However, due to content restrictions and various other factors that may impact the quality of the viewer experience, such as transmissions reliability, network bandwidth and/or capacity, and the like, there is also continued demand for multimedia content distributed over-the-air, via cable, via satellite, and the like. Often, each distribution source of content has required the use of specialized dedicated hardware, such as antennas, receivers, tuners, set-top boxes, routers, modems, and the like. Additionally, wiring and cabling is often required to route signals between such hardware components (e.g., from an outdoor antenna to an indoor box) or from various hardware components to the desired destination devices for presenting the received content. Thus, upgrading or installing support for another content distribution source can entail complex wiring or cabling, which can become unwieldy, inflexible, and prohibitive. Accordingly, it is desirable to support multiple different content distribution sources in a manner that minimizes installation costs and complexity while also providing flexibility and adaptability to support content presentation at any number of different destination devices. Other desirable features and characteristics will become apparent from the subsequent detailed description and the appended claims, taken in conjunction with the accompanying drawings and the foregoing technical field and background.

BRIEF SUMMARY

Embodiments of devices, methods, and systems are provided for delivering media content from a plurality of different content sources to a plurality of different destination devices using an aggregation hub. An exemplary device includes a first input interface to receive a broadcast signal corresponding to first media content, a second input interface to receive a telecommunications signal corresponding to second media content, an output interface, a content stream management module, an encapsulation module, and a communications interface. The content stream management module is coupled to the first input interface and the second input interface to multiplex a first content stream corresponding to the first media content and a second content stream corresponding to the second media content into a multiplexed content stream. The encapsulation module is coupled to the content stream management module to encapsulate the multiplexed content stream into a packetized multiplexed content stream according to a communications protocol. The communications interface is coupled to the encapsulation module and the output interface to transmit the packetized multiplexed content stream via the output interface.

In another embodiment, a media delivery system is provided. The system includes a first receiver arrangement to receive a broadcast signal including first media content, a telecommunications module to receive a telecommunications signal including second media content, and a hub device coupled to the first receiver arrangement and the telecommunications module to obtain a first transport stream corresponding to the first media content from the broadcast signal, obtain a second transport stream corresponding to the second media content from the telecommunications signal, multiplex the first transport stream and the second transport stream, encapsulate the multiplexed first and second transport streams into a packetized multiplexed content stream, and output the packetized multiplexed content stream.

In yet another embodiment, a method of delivering media content from a plurality of different content sources to a plurality of different destination devices is provided. The method involves multiplexing, at a hub device coupled to the plurality of different content sources, different content streams from different ones of the plurality of different content sources into a multiplexed content stream, encapsulating, at the hub device, the multiplexed content stream in accordance with a communications protocol, and transmitting, by the hub device, the packetized multiplexed content stream to a gateway device coupled to the plurality of different destination devices.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to aggregating media content from different content sources for redelivery to multiple different destination devices. In exemplary embodiments, broadcast, multicast, and/or unicast content streams from different types of content sources are aggregated at a hub. The hub multiplexes the different content streams from different content sources into a multiplexed content stream that includes media programs or other content selected for presentation or provisioning to different destination devices. In exemplary embodiments, the hub packetizes, encodes, or otherwise encapsulates the multiplexed content stream into a packetized stream that is transmitted or provided to a gateway. The gateway demultiplexes and distributes or otherwise delivers individual instances of media content to the appropriate destination device for which the respective instance of media content was selected or designated.

As used herein, "media content," "media program," "multimedia content," or variants thereof should be understood as referring to any audiovisual programming or content in any streaming, file-based or other format. The media content generally includes data that, when processed by a media player or decoder, allows the media player or decoder to present a visual and/or audio representation of the corresponding program content to a viewer (i.e., user of the destination device including the media player or decoder). In one or more embodiments, a media player can be realized as a piece of software that plays multimedia content (e.g., displays video and plays audio), and depending on the embodiment, the media player can be a standalone software application, a web browser plug-in, a combination of browser plug-in and supporting web page logic, or the like.

In one or more exemplary embodiments, the hub is located outside or on the exterior of a building or structure, while the gateway is located within the interior of building or structure. In this regard, by virtue of the multiplexed content stream being capable of including instances of media content from different content sources, only a single wire or cable can be utilized to cross the outdoor/indoor interface and effectively connect the gateway to multiple different content sources via the hub. For example, rather than running cable from each content source outside of the building (e.g., a satellite dish or receiver, an over-the-air television antenna or receiver, a cable television distribution network, a fixed wireless antenna or transceiver, and/or the like) and potentially requiring multiple entry points into the building, a single cable and single entry point can be utilized to connect the hub to the gateway. The hub is connected to the various antennas and receivers outside of the building and multiplexes content streams from the different antennas and receivers into a common stream that can be packetized and transmitted to the gateway over an individual cable. In some embodiments, the packetization allows the gateway to demultiplex and transmit the reconstituted media content streams to the appropriate destination devices without any converting, transcoding, or reformatting of the packets. That is, the packetized multiplexed content stream may utilize the same communications protocol utilized by the gateway to communicate with a destination device, thereby reducing latencies or delays that could otherwise be associated with converting, transcoding, or reformatting operations at the gateway.

Figure 1:
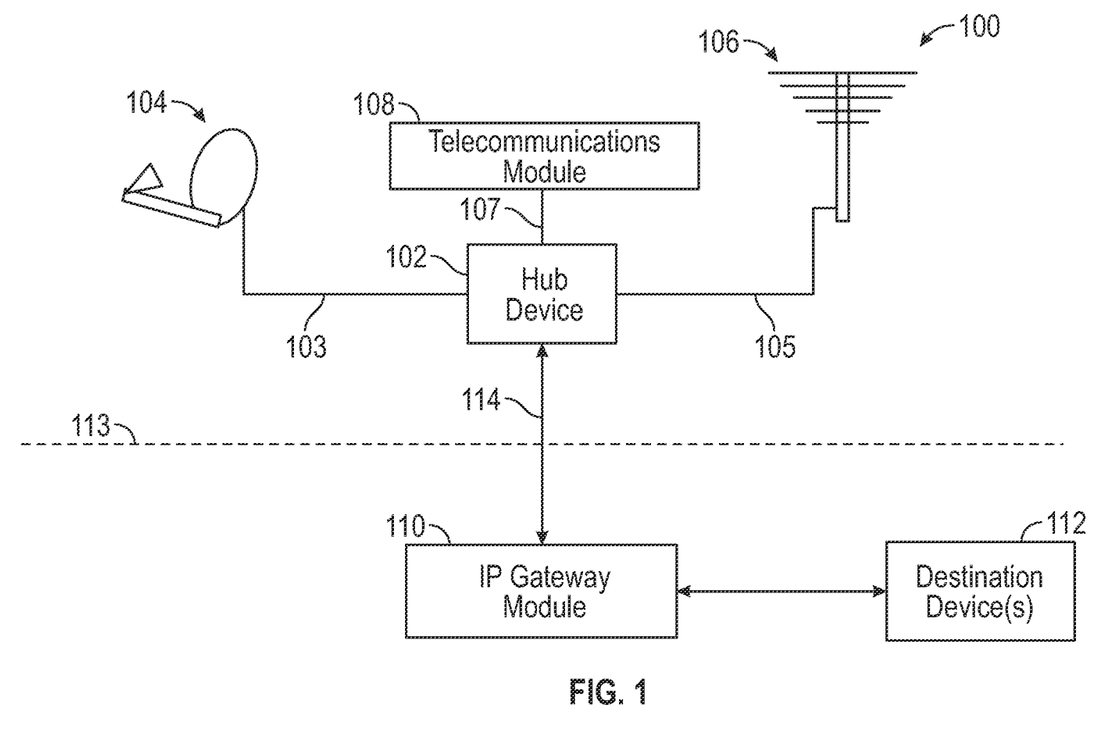
FIG. 1 depicts a block diagram of an exemplary embodiment of a media delivery system.

Turning now to FIG. 1, an exemplary media delivery system 100 includes, without limitation, a hub device 102 coupled to a plurality of different content sources 104, 106, 108 and a gateway module 110 coupled to the hub device 102 to receive media content from different content sources 104, 106, 108 via the hub device 102 and transmit or otherwise provide media content to any number of destination devices 112. In exemplary embodiments, the hub device 102 is located outdoors or exterior to a building or structure, and the gateway module 110 is located indoors or on the interior of the building or structure, with the hub device 102 and the gateway module 110 being communicatively coupled across the outdoor/indoor interface 113 by a communications medium 114. In this regard, rather than utilizing a dedicated communications medium to communicate with each different content source 104, 106, 108 across the outdoor/indoor interface 113, only a single communications medium 114 may be utilized to communicate media content from the different content sources 104, 106, 108 to the gateway module 110 via the hub device 102.

The illustrated media delivery system 100 includes a satellite content source 104 that generally represents the combination of antennas, receivers, and other components capable of receiving digital broadcast satellite (DBS) signals from a satellite distribution network. In the illustrated embodiment, the satellite content source 104 is coupled to the hub device 102 via a physical communications medium 103, such as a coaxial cable. The illustrated media delivery system 100 also includes a television content source 106 that generally represents the combination of antennas, receivers, and other components capable of receiving over-the-air broadcast television signals. In alternative embodiments, the television content source 106 could be configured to receive broadcast television signals from a cable distribution network. Similar to the satellite content source 104, in exemplary embodiments, the hub device 102 is communicatively coupled to the television content source 106 via a coaxial cable or other physical communications medium 105.

In exemplary embodiments, the media delivery system 100 also includes a telecommunications network content source 108, which generally represents the combination of antennas, receivers, and other components capable of receiving signals communicated over a telecommunications network, such as, for example, a fixed wireless network, a wide area network, or the like. In exemplary embodiments, the telecommunications network content source 108 is coupled to the hub device 102 via an Ethernet cable 107; however, in practice, another other physical communications medium could be utilized to communicatively couple a telecommunications network content source 108 to the hub device 102.

The hub device 102 generally represents the combination of hardware, circuitry, logic, firmware, software and/or other components configured to support multiplexing signals from the different content sources 104, 106, 108 corresponding to different media content streams into a multiplexed content stream that is then packetized and transmitted to the gateway module 110 via the communications medium 114, as described in greater detail below in the context of FIGS. 2-3. In one or more exemplary embodiments, the multiplexed content stream is packetized in accordance with the internet protocol (IP). In exemplary embodiments, the hub device 102 includes a port, pin, terminal, connector, socket, or other interface that supports communications over a physical communications medium 114 between the hub device 102 and the gateway module 110. For example, depending on the embodiment, the physical communications medium 114 coupling the hub device 102 and the gateway module 110 may be realized as a coaxial cable, an Ethernet cable, a twisted pair cable, or other suitable cabling or wiring for transmitting the packetized content stream output by the hub device 102. That said, in alternative embodiments, the hub device 102 may be configured to support wirelessly transmitting the packetized content stream to the gateway module 110.

The gateway module 110 generally represents the combination of hardware, circuitry, logic, firmware, software and/or other components capable of receiving the packetized multiplexed content stream from the hub device 102 via the communications medium 114, demultiplexing the packetized multiplexed content stream into individual media content streams, and transmitting or otherwise providing the individual media content streams to the appropriate destination devices 112. For example, the gateway module 110 may be realized as a router, a set-top box, or other device that supports communications with multiple different destination devices 112 via multiple different communications mediums or interfaces. In this regard, the gateway module 110 may include one or more transceivers configured to support wirelessly transmitting a media content stream to a destination device 112, such as a smartphone, cellular phone, or other mobile device. Additionally or alternatively, the gateway module 110 may include any number of ports, sockets, connectors, or other interfaces configured to support transmitting a media content stream to a destination device 112 via a physical communications medium, such as, for example, a coaxial cable, an Ethernet cable, a twisted pair cable, a universal serial bus (USB) cable, a digital display interface, and/or the like. It should be noted that in some embodiments, the gateway module 110 could be realized as a set-top box or similar device with router functionality integrated therewith, or vice versa.

The destination devices 112 generally represent any sort of electronic devices capable of receiving and presenting media content from the gateway module 110. For example, one or more destination devices 112 could be realized as a personal computer, mobile telephone, tablet or other network-enabled electronic device that is capable of wirelessly communicating with the gateway module 110, and that includes an electronic display, speaker, or other audiovisual output interface capable of presenting received media content. In some embodiments, one or more of the destination devices 112 may be realized as a television, monitor, liquid crystal display (LCD), light emitting diode (LED) display, plasma display, or the like that reproduces media content received from the gateway module 110, either wirelessly or by way of a physical communications medium, such as a coaxial cable or other cabling or wiring. In yet other embodiments, one or more of the destination devices 112 may be realized as a set-top box, an over-the-top (OTT) streaming device, a gaming console, or the like, which could similarly communicate with the gateway module 110 either wirelessly or via a physical communications medium. In such embodiments, a set-top box 112 may include a smart card or other access module that includes authorization (or subscription) information that facilitates receiving and/or decoding media content provided from a satellite content source 104, a cable distribution network, or the like. Additionally, a set-top box 112 could include a data storage element configured to support a digital video recorder (DVR) feature and/or functionality, as well as a display interface for providing imagery and/or video corresponding to a media program to a display device (e.g., a television or other monitor) coupled to the set-top box 112.

It should be appreciated that FIG. 1 is a simplified representation of a media delivery system 100 for purposes of explanation and is not intended to be limiting. In this regard, although FIG. 1 depicts the hub device 102 as a standalone component in the media delivery system 100, in various alternative embodiments, the hub device 102 may be integrated with hardware associated with any one of the content sources 104, 106, 108. For example, the hub device 102 may be implemented or realized using an integrated circuit, a system on a chip, or another integrated or encapsulated module that may be installed or housed within the hardware for one of the content sources 104, 106, 108, such as, for example, on the same circuit board or substrate as a receiver, demodulator, block converter, or other electronics module associated with a particular content source 104, 106, 108 and contained within a common housing. Such embodiments could eliminate a cable, wire, or other physical communications medium that would otherwise be utilized to couple the hub device 102 to the respective content source 104, 106, 108, as will be readily appreciated. The hub device 102 could also be integrated into an antenna or receiver module associated with a broadcast content source 104, 106, or otherwise contained within a housing for an antenna or receiver, to thereby provide a relatively compact integrated device providing both radio and hub functionality.

Figure 2:
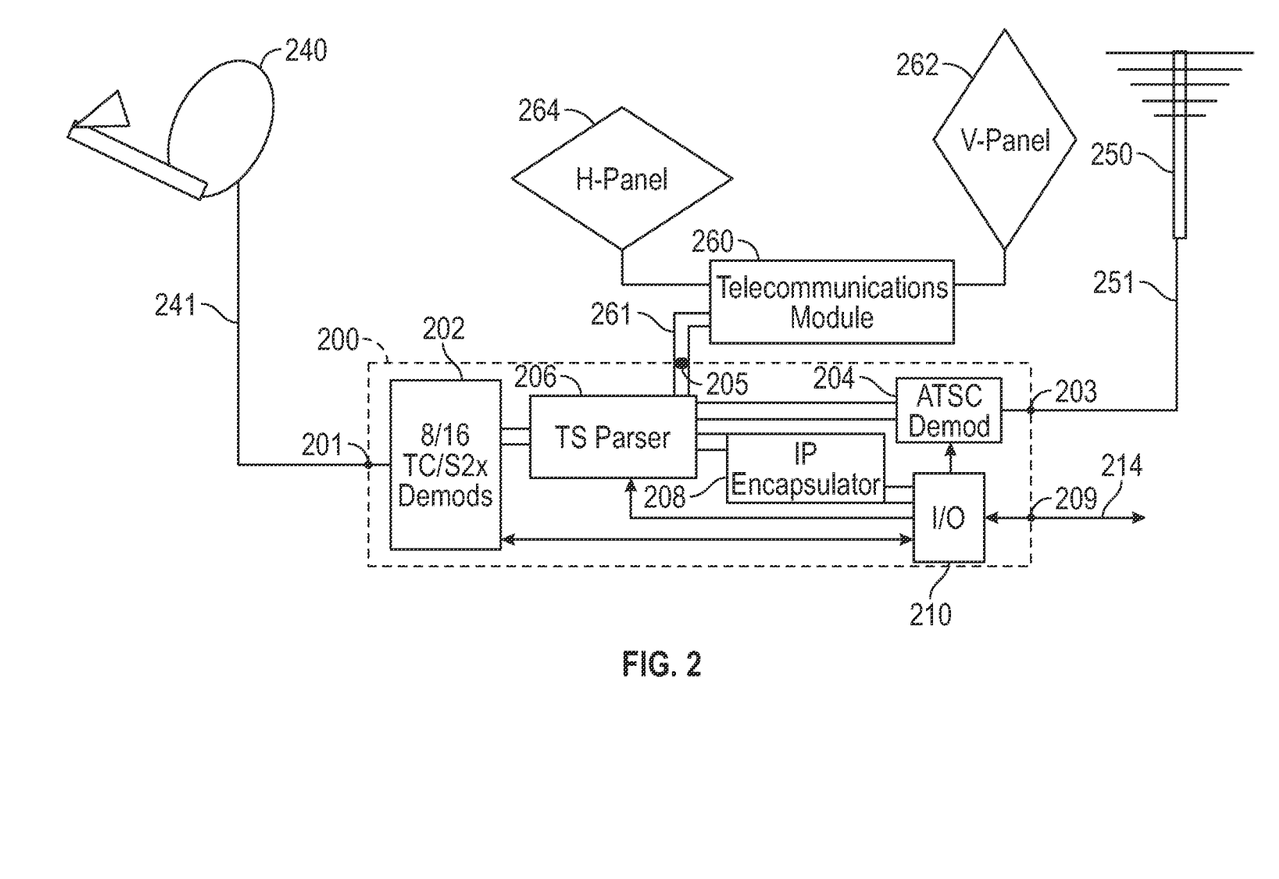
FIG. 2 depicts a block diagram of an exemplary embodiment of a media hub device suitable for use in a media delivery system.

FIG. 2 depicts an exemplary embodiment of a hub device 200 suitable for use as the hub device 102 in the media delivery system 100 of FIG. 1. The illustrated hub device 200 includes, without limitation, a satellite signal demodulation module 202, an over-the-air broadcast demodulation module 204, a content stream management module 206, an encapsulation module 210 (or encapsulator), and a communications interface 210. In exemplary embodiments, the hub device 200 is realized as an integrated circuit or system on a chip, where the elements 202, 204, 206, 208, 210 of the hub device 200 are formed or otherwise provided on a common substrate and encapsulated or otherwise housed to provide a monolithic modular device 200 that can be installed in a media delivery system, either as a standalone component or integrated within another component of a media delivery system. It should be appreciated that FIG. 2 is a simplified representation of a hub device 200 for purposes of explanation and is not intended to be limiting.

The satellite signal demodulation module 202 generally represents the hardware, firmware, circuitry and/or logic coupled to a satellite signal input interface 201 of the hub device 200 to receive direct broadcast satellite (DBS) signals (or block-converted intermediate frequency (IF) signals) from a DBS receiver arrangement 240 and convert the DBS signals into a media content transport stream. In this regard, the satellite signal demodulation module 202 may include one or more tuners, demultiplexers, demodulators, decoders, encoders, codecs, and/or the like. In some embodiments, the satellite signal demodulation module 202 may also include a smart card or other access module that includes authorization (or subscription) information that facilitates receiving and/or decoding DBS signals, so that downstream destination devices 112 can receive and view content from the satellite distribution network without dependence on a set-top box or other access controls downstream of the hub device 200. In one embodiment, the satellite signal interface 201 may be realized as a coaxial cable connector that is coupled to the low-noise block downconverter (LNB) of the DBS receiver arrangement 240 via a coaxial cable 241.

The DBS demodulation module 202 receives DBS signals, such as quadrature phase shift keyed (QPSK) or 8-level phase shift keyed (8PSK) signals, and converts the received DBS signals into a media content stream corresponding to the selected or desired broadcast channels for presentation at a destination device 112. In this regard, the DBS demodulation module 202 may receive indication of satellite channel selections for presentation on one or more destination devices 112 from the gateway module 110 via the communications interface 210 using frequency shift keying or other suitable command and control protocols, such as, for example, Digital Satellite Equipment Control (DiSEqC). The DBS demodulation module 202 demodulates or otherwise converts the selected channels into one or more media content streams that are output or otherwise provided to the content stream management module 206. For example, the input DBS signals to the DBS demodulation module 202 may have bandwidths in the range of about 15 MHz to about 30 MHz and data rates in the range of about 20 Mbits/s to about 60 Mbits, and be formatted in accordance with a Digital Video Broadcasting-Satellite standard (e.g., DVB-S, DVB-S2, DVB-S2x) or a proprietary standard associated with the satellite provider, and the output content stream provided by the DBS demodulation module 202 may be realized as a media content transport stream formatted in accordance with a Moving Picture Experts Group (MPEG) standard, such as MPEG-4.

The OTA broadcast signal demodulation module 204 generally represents the hardware, firmware, circuitry and/or logic coupled to an OTA broadcast signal input interface 203 of the hub device 200 to receive OTA broadcast signals from an OTA broadcast receiver arrangement 250. For example, in one embodiment, the OTA broadcast signal interface 203 may be realized as a coaxial cable connector that is coupled to an OTA broadcast antenna 250 via a coaxial cable 251. The OTA broadcast signal demodulation module 204 may include one or more tuners, demultiplexer, demodulators, decoders, encoders, codecs, and/or the like configured to support demodulating or converting an OTA broadcast signal into a media content transport stream. In this regard, the OTA broadcast signal demodulation module 204 may support downstream destination devices 112 receiving and viewing OTA broadcast media content without dependence on a set-top box or requiring tuners or other receiver components at the destination device 112.

In one or more embodiments, the OTA broadcast signal demodulation module 204 is configured to receive OTA or terrestrial broadcast signals modulated using 8-level vestigial sideband modulation (8VSB) or layered division multiplexing (LDM) in accordance with an Advanced Television Systems Committee (ATSC) standard, such as ATSC-1.0 or ATSC-3.0, with data rates in the range of about 19.3 Mbits/s to about 30 Mbits/s. The OTA broadcast signal demodulation module 204 demodulates the received OTA broadcast signals into a media content stream corresponding to the selected or desired broadcast channels for presentation at a destination device 112. In this regard, the OTA broadcast signal demodulation module 204 may receive indication of channel selections for presentation on one or more destination devices 112 from the gateway module 110 via the communications interface 210. The OTA broadcast signal demodulation module 204 demodulates or otherwise converts the selected channels into one or more media content streams that are output or otherwise provided to the content stream management module 206. For example, in one or more embodiments, the OTA broadcast signal demodulation module 204 converts an OTA ATSC broadcast signal into an MPEG-2 transport stream provided to the content stream management module 206.

The content stream management module 206 generally represents the hardware, firmware, software, circuitry and/or logic components of the hub device 200 that are configured to support multiplexing content streams received from the broadcast demodulators 202, 204 with content streams received from a telecommunications module 260 into a multiplexed content stream output to the encapsulator 208. In the illustrated embodiment, the telecommunications module 260 is configured to support communications to/from a wireless network, such as, for example, a fixed wireless network, a wide area network, a cellular network, or other network supporting a Long-Term Evolution (LTE) standard or fifth generation (5G) standard. The telecommunications module 260 generally represents the transmitters, receivers, transceivers, and other components that are coupled to one or more antennas 262, 264 to receive wireless signals. In this regard, the illustrated embodiment includes a vertical antenna 262 and a horizontal antenna 264 for signal reception. The telecommunications module 260 converts the received wireless signals into a corresponding content stream provided at a telecommunications network signal input interface 205 of the hub device 200. For example, the telecommunications module 260 may receive orthogonal frequency-division multiplexed (OFDM) wireless signals via the antennas 262, 264 and demodulate, demultiplex, or otherwise convert the received wireless signals into a transport stream corresponding to media content to be received from the telecommunications network. Depending on the embodiment, the content stream provided by the telecommunications module 260 could be realized as a MPEG-4 transport stream, a MPEG-2 transport stream, or a content stream formatted in accordance with H.264 (e.g., MPEG-4 Part 10 or Advanced Video Coding), advanced audio coding (AAC), or another suitable format. In some embodiments, the bandwidth of the wireless signals received via the antennas 262, 264 is greater than the bandwidth associated with the DBS broadcast signals and/or the OTA broadcast signals. In one embodiment, the telecommunications network interface 205 of the hub device 200 is realized as an Ethernet port coupled to the telecommunications module 260 via an Ethernet cable 261; however, it should be noted that in practice, other physical communications mediums could be utilized.

In exemplary embodiments, the content stream management module 206 receives indication of the selected content streams from the particular content sources that are desired for presentation or provisioning to a destination device 112 from a gateway module 110 via the communications interface 210. In this regard, destination devices 112 may transmit or otherwise provide, to the gateway module 110, an indication of a particular content source and particular channel or content stream associated therewith that the user of the destination device 112 would like to view or otherwise receive at the destination device 112. In response, the gateway module 110 transmits or otherwise provides indication of the selected content source and content stream to the hub device 102, 200 at the communications interface 210, which, in turn, commands, signals, or otherwise instructs the content stream management module 206 to select that particular content stream into the content stream management module 206 for subsequent downstream processing. In this regard, the content stream management module 206 parses the input content streams to select the desired media content and discards, filters, or otherwise ignores content streams input to the content stream management module 206 that are not selected or indicated by the gateway module 110.

For each selected content stream provided by a broadcast demodulation module 202, 204 or at the telecommunications network interface 205, the content stream management module 206 multiplexes the selected content stream with other selected content streams input to the content stream management module 206 to provide a multiplexed content stream including individual or blocks of byte based packets of the respective content streams. For example, in one or more embodiments, where the content streams input to the content stream management module 206 are all realized as MPEG transport streams, the content stream management module 206 uses time-division multiplexing to multiplex the MPEG transport streams corresponding to the selected media content from the different content sources 240, 250, 260. In this regard, in some embodiments, the multiplexed content stream output by the content stream management module 206 may include DBS media content, OTA broadcast media content, and OTT media content multiplexed into one content stream. For purposes of explanation, but without limitation, the content stream management module 206 may alternatively be referred to herein as the transport stream (TS) parsing module (or TS parser).

The encapsulation module 208 generally represents the hardware, firmware, software, circuitry and/or logic components of the hub device 200 that are configured to receive the multiplexed content stream output by the TS parser 206 and encode or otherwise encapsulate the multiplexed content stream using a communications protocol, such as, for example, Internet Protocol version 4 (IPv4), Internet Protocol version 6 (IPv6), or another suitable Transmission Control Protocol (TCP) or IP format. Accordingly, for purposes of explanation, the encapsulation module 208 may alternatively be referred to herein as an IP encapsulator. The output of the IP encapsulator 208 is a packetized multiplexed content stream. In one or more embodiments, individual packets of the stream are encoded with a header or other non-payload data that includes information identifying one or more of the media content, the source of the media content encapsulated therein, and/or the intended destination device 112 for the media content encapsulated therein, which, in turn, may be utilized by the gateway device 110 to route, forward, or otherwise provide individual packets to the appropriate destination device 112 for subsequent decoding and presentation.

The communications interface 210 generally represents the hardware, firmware, software, circuitry and/or logic components of the hub device 200 that are configured to support communications with a gateway module 110 via a communications medium 214 coupled to a gateway interface 209 of the hub device 200. In this regard, the communications interface 210 may modulate the packetized multiplexed content stream from the IP encapsulator 208 prior to transmission via the communications medium 214. For example, in one embodiment, the gateway interface 209 is realized as a coaxial connector that supports communications with a gateway module 110 via a coaxial cable 214 coupled thereto, with the communications interface 210 being configured to support communications using a Multimedia over Coax Alliance (MoCA) standard. In another embodiment, the gateway interface 209 is realized as an Ethernet port that supports communications with a gateway module 110 via an Ethernet cable 214 coupled thereto using a Power over Ethernet (PoE) standard. In yet other embodiments, the gateway interface 209 could be realized as a port or socket that supports communications with a gateway module 110 via a twisted pair cable 214 coupled thereto using a G.hn standard. In this regard, it should be appreciated that the subject matter described herein is not limited to any particular communications medium or standard for communications between the hub device 200 and a gateway module 110.

It should be noted that although FIG. 2 depicts the elements 202, 204, 206, 208, 210 of the hub device 200 being implemented as separate modules (e.g., logically distinct arrangements of processing, data storage or memory, and/or other circuitry), in other embodiments, one or more of the elements 202, 204, 206, 208, 210 may be implemented using a common processing system or module. For example, one or more processors, central processing units (CPUs), graphics processing units (GPUs), controllers, microprocessors, microcontrollers, processing cores, field-programmable gate arrays (FPGAs), and/or other computing resources may include or otherwise be coupled to a data storage element (or memory) capable of storing programming instructions for execution that, when read and executed, cause the processing system to implement two or more of the elements 202, 204, 206, 208, 210 using common hardware. That said, in other embodiments such as that depicted in FIG. 2, each of the elements 202, 204, 206, 208, 210 of the hub device 200 may be realized using a logically distinct set of hardware, circuitry, and/or other components that supports its own unique set of firmware and/or software to achieve the functionality of the respective element 202, 204, 206, 208, 210.

Figure 3:
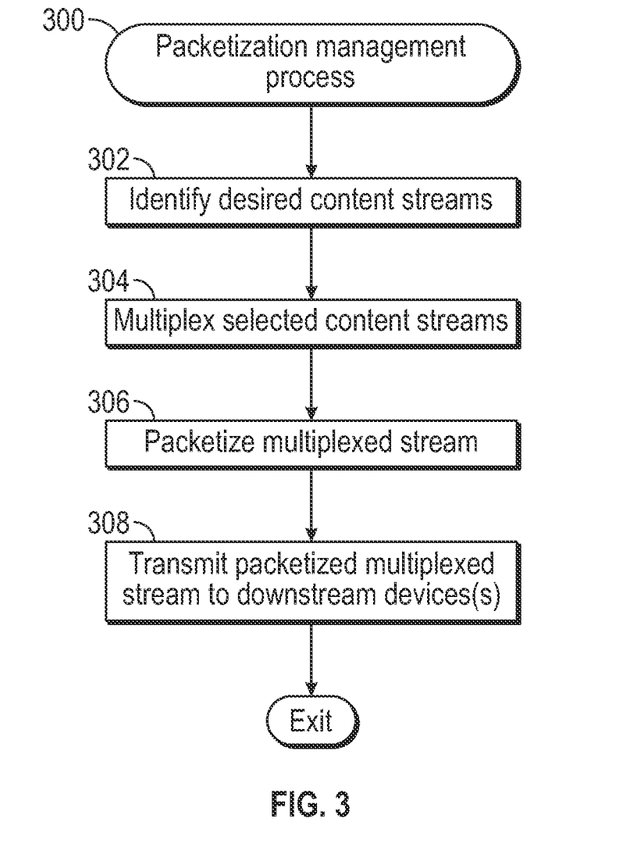
FIG. 3 is a flowchart of an exemplary packetization management process suitable for implementation by a media hub device in a media delivery system in accordance with one or more embodiments.

Turning now to FIG. 3, a hub device 102, 200 in a media delivery system 100 is configured to support a packetization management process 300 to convert different instances of media content from different content sources into a common packetized content stream that can be provided to a gateway module 110 for subsequent delivery or distribution to the intended recipients of the various instances of media content. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the packetization management process 300 may be performed by different elements of a media delivery system 100. That said, for purposes of explanation, the packetization management process 300 is described here primarily in the context of being performed by the hub device 102, 200. It should be appreciated that the packetization management process 300 may include any number of additional or alternative tasks, the tasks need not be performed in the illustrated order and/or the tasks may be performed concurrently, and/or the packetization management process 300 may be incorporated into a more comprehensive procedure or process having additional functionality not described in detail herein. Moreover, one or more of the tasks shown and described in the context of FIG. 3 could be omitted from a practical embodiment of the packetization management process 300 as long as the intended overall functionality remains intact.

The illustrated packetization management process 300 initializes by selecting or otherwise identifying the desired content streams for presentation or provisioning to any number of end user destination devices and multiplexing or otherwise combining the selected content streams from different content sources into a common transport stream (tasks 302, 304). In this regard, users of the destination devices 112 may manipulate the respective destination devices 112 or applications executing thereon to input or otherwise indicate media content that a user would like to view, record, or otherwise obtain at that respective destination device 112, for example, by interacting with a program guide, home page, or other graphical user interface to select a particular broadcast channel or media program for presentation. The destination device 112 then transmits a request or indication of the desired media content and source thereof to the gateway module 110, which, in turn provides the request or indication to the TS parser 206 via the communications interface 210. The TS parser 206 selects or otherwise retrieves the selected media content streams from their associated sources 240, 250, 260 and then multiplexes the different media content streams from the different sources into a common multiplexed transport stream.

The packetization management process 300 continues by encoding, transcoding, encapsulating, or otherwise packetizing the multiplexed media content stream into a packetized content stream and then transmits or otherwise provides the packetized multiplexed content stream to downstream destination devices via a gateway module (tasks 306, 308). In this regard, as described above, the IP encapsulator 208 receives the multiplexed media content transport stream output by the TS parser 206 and encodes, transcodes, or otherwise encapsulates the multiplexed media content transport stream into a stream of packets formatted in accordance with a TCP/IP communications protocol or standard. The packetized stream is output by the IP encapsulator 208 to the communications interface 210 which transmits the packetized multiplexed content stream to the gateway module 110 via a communications medium 114, 214. In one or more exemplary embodiments, the gateway module 110 demodulates and demultiplexes the packetized multiplexed content stream into individual packetized content streams that may then be transmitted or otherwise provided to the destination device 112 that requested the particular instance of media content using a TCP/IP communications protocol (e.g., via a wireless local area network). The recipient destination device 112 may then decode the received packets corresponding to the selected media content, reconstitute the media content stream from the received packets, and then present or otherwise reproduce the media content based on the reconstituted media content stream.

In some embodiments, either the gateway module 110 or a destination device 112 may be realized as a placeshifting device capable of shifting the viewing experience from the interior of the building or structure to another location. In this regard, the placeshifting device generally includes a control module or processing system, a data storage element or memory, and one or more network interfaces or communications modules support communications over a network. In this regard, a placeshifting destination device 112 may be configured to route, forward, or retransmit a demultiplexed packetized transport stream received from the gateway module 110 over a cellular network or other telecommunications network (which may be different from that associated with the telecommunications network content source 108) to a different destination device external to the building or structure containing the gateway module 110, with that external destination device decoding and presenting the media content originally provided by the gateway module 110 to the placeshifting destination device 112. By virtue of the media content incoming to the placeshifting destination device 112 being encapsulated, the amount of transcoding or encoding required at the placeshifting destination device 112 for placeshifting the media content may be reduced or eliminated, thereby reducing latencies associated with the placeshifting (e.g., minimizing the amount of lag-behind-live for a broadcast of a live event that is being placeshifted).

To briefly summarize, the subject matter described herein allows for media content from numerous different sources distributing media content to be aggregated and multiplexed at a hub outside a building or structure, and then communicated to a gateway on the interior of the building or structure via a common communications medium. For example, a single coaxial cable may be utilized to transmit DBS-based media content, OTA terrestrial broadcast media content, and OTT or other network-based content from the hub device to a single gateway device, which, in turn, routes the media content to the appropriate destination devices. In this regard, the end user devices do not necessarily need to be equipped with set-top boxes, tuners, or other specialized components for receiving and/or decoding media content, and moreover, the end user devices do not need to be physically wired or connected to the gateway device or any particular source of content. For example, the hub device may include or otherwise incorporate demodulators, demultiplexers, decoders, descramblers, and the like to obtain media content transport streams from an input broadcast signal and then multiplex and packetize the media content transport streams into a multiplexed packetized stream provided to the gateway device, which, in turn, routes the media content (or packets associated therewith) to the appropriate destination device for presentation.

It should be noted that the general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to satellite broadcasting, terrestrial broadcasting, multicasting, content distribution or delivery networks, encoding/decoding standards or protocols, content formats, file structures, buffering, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of providing media content from a plurality of different content sources to a plurality of different destination devices, the method comprising:

receiving, at a gateway, an indication of a selected media content stream and a selected content source from a destination device of the plurality of different destination devices;

providing, by the gateway, the indication to a hub device, wherein the hub device receives the selected media content stream from the selected content source and multiplexes the selected media content stream from the selected content source into a multiplexed transport stream prior to transcoding the multiplexed transport stream into a packetized multiplexed content stream;

receiving, at the gateway, the packetized multiplexed content stream from the hub device,
wherein individual packets of the packetized multiplexed content stream are encoded with information identifying a source of the media content encapsulated therein or an intended destination device of the plurality of different destination devices for the media content encapsulated therein; and transmitting, by the gateway, the individual packets to intended destination devices of the plurality of different destination devices utilizing the information identifying the source of the media content encapsulated therein or the intended destination device of the plurality of different destination devices for the media content encapsulated therein.

2. The method of claim 1, wherein receiving the packetized multiplexed content stream at the gateway comprises receiving the packetized multiplexed content stream via a physical communications medium coupling the hub device and the gateway.

3. The method of claim 2, wherein:
the physical communications medium comprises a coaxial cable; and
receiving the packetized multiplexed content stream via the physical communications medium comprises receiving the packetized multiplexed content stream via the coaxial cable using a Multimedia over Coax Alliance (MoCA) standard.

4. The method of claim 2, wherein:
the physical communications medium comprises an Ethernet cable; and
receiving the packetized multiplexed content stream via the physical communications medium comprises receiving the packetized multiplexed content stream via the Ethernet cable using a Power over Ethernet (PoE) standard.

5. The method of claim 2, wherein:
the physical communications medium comprises a twisted pair cable; and
receiving the packetized multiplexed content stream via the physical communications medium comprises receiving the packetized multiplexed content stream via the twisted pair cable using a G.hn standard.

6. The method of claim 2, wherein transmitting the individual packets comprises the gateway wirelessly transmitting the individual packets to a destination device of the plurality of different destination devices.

7. The method of claim 1, wherein transmitting the individual packets comprises the gateway wirelessly transmitting the individual packets to a destination device of the plurality of different destination devices.

8. The method of claim 1, wherein the gateway comprises a set-top box.

9. The method of claim 1, further comprising demultiplexing, by the gateway, the packetized multiplexed content stream into individual packetized content streams,
wherein transmitting the individual packets to the intended destination devices of the plurality of different destination devices comprises transmitting the individual packetized content streams to the intended destination devices.

10. The method of claim 9, wherein:
the individual packetized content streams comprise a demultiplexed packetized transport stream; and
at least one of the plurality of different destination devices comprises a placeshifting device configured to retransmit the demultiplexed packetized transport stream received from the gateway to a different destination device.

11. The method of claim 1, wherein the hub device is exterior to a building or a structure and the gateway is located within an interior of the building or the structure.

12. The method of claim 1, wherein transmitting the individual packets to the intended destination devices of the plurality of different destination devices comprises transmitting the individual packets utilizing a same communications protocol as the packetized multiplexed content stream.

13. The method of claim 1, wherein the individual packets are encoded with a header or non-payload data that includes the information identifying the source of the media content encapsulated therein or the intended destination device of the plurality of different destination devices for the media content encapsulated therein.

14. The method of claim 13, wherein transmitting the individual packets comprises the gateway utilizing the header or the non-payload data to route the individual packets to the intended destination devices for subsequent decoding and presentation.

15. The method of claim 1, wherein the packetized multiplexed content stream is formatted in accordance with an internet protocol (IP) standard.

16. The method of claim 15, wherein the packetized multiplexed content stream comprises a multiplexed content transport stream transcoded from formatting in accordance with a Motion Pictures Expert Group (MPEG) standard.

17. A non-transitory computer-readable medium having instructions stored thereon that are executable by a processing system to:
receive an indication of a selected media content stream and a selected content source from a destination device of a plurality of different destination devices;
transmit the indication to a hub device, wherein the hub device receives the selected media content stream from the selected content source and multiplexes the selected media content stream from the selected content source into a multiplexed transport stream prior to transcoding the multiplexed transport stream into a packetized multiplexed content stream;
receive the packetized multiplexed content stream from the hub device, wherein individual packets of the packetized multiplexed content stream are encoded with information identifying a source of media content encapsulated therein or an intended destination device of the plurality of different destination devices for the media content encapsulated therein; and
transmit the individual packets to intended destination devices of the plurality of different destination devices utilizing the information identifying the source of the media content encapsulated therein or the intended destination device of the plurality of different destination devices for the media content encapsulated therein.

18. The non-transitory computer-readable medium of claim 17, wherein the instructions are executable by the processing system to demultiplex the packetized multiplexed content stream into individual packetized content streams prior to transmitting the individual packetized content streams to the intended destination devices.

19. A gateway device comprising:
- an interface to receive a packetized multiplexed content stream from a hub device,
  - wherein the interface receives an indication of a selected media content stream and a selected content source from a destination device of a plurality of different destination devices;
  - wherein individual packets of the packetized multiplexed content stream are encoded with information identifying a source of media content encapsulated therein or an intended destination device of the plurality of different destination devices for the media content encapsulated therein; and
- a transceiver to transmit individual packetized content streams to appropriate ones of the plurality of different destination devices,
  - wherein the transceiver sends the indication to the hub device,
  - wherein the hub device receives the selected media content stream from the selected content source and multiplexes the selected media content stream from the selected content source into a multiplexed transport stream prior to transcoding the multiplexed transport stream into the packetized multiplexed content stream, and
  - wherein the gateway device is configured to demultiplex the packetized multiplexed content stream into the individual packetized content streams.

* * * * *